United States Patent
Blomgren

[11] Patent Number: 5,935,198
[45] Date of Patent: Aug. 10, 1999

[54] MULTIPLIER WITH SELECTABLE BOOTH ENCODERS FOR PERFORMING 3D GRAPHICS INTERPOLATIONS WITH TWO MULTIPLIES IN A SINGLE PASS THROUGH THE MULTIPLIER

[75] Inventor: James S. Blomgren, San Jose, Calif.

[73] Assignee: S3 Incorporated, Santa Clara, Calif.

[21] Appl. No.: 08/755,545

[22] Filed: Nov. 22, 1996

[51] Int. Cl.$^6$ ................................. G06F 7/38; G06F 7/52

[52] U.S. Cl. .......................................... 708/290; 208/62.9

[58] Field of Search .................................... 364/723, 786, 364/757–760, 760.01–760.02

[56] References Cited

U.S. PATENT DOCUMENTS

| | | |
|---|---|---|
| 4,546,446 | 10/1985 | Machida . |
| 5,138,699 | 8/1992 | Minor et al. ............................. 395/131 |
| 5,157,388 | 10/1992 | Kohn ....................................... 340/800 |
| 5,299,300 | 3/1994 | Femal et al. ............................. 395/128 |
| 5,307,450 | 4/1994 | Grossman ................................ 395/123 |
| 5,345,541 | 9/1994 | Kelley et al. ............................ 364/723 |
| 5,396,592 | 3/1995 | Fujimoto ................................. 395/162 |
| 5,402,533 | 3/1995 | Kelley et al. . |
| 5,444,835 | 8/1995 | Turkowski . |
| 5,457,775 | 10/1995 | Johnson, Jr. et al. .................. 395/141 |
| 5,459,823 | 10/1995 | Silverbrook et al. ................... 395/131 |
| 5,493,644 | 2/1996 | Thayer et al. ........................... 395/163 |
| 5,544,292 | 8/1996 | Winser .................................... 395/130 |
| 5,548,709 | 8/1996 | Hannah et al. .......................... 395/164 |
| 5,550,960 | 8/1996 | Shirman et al. ........................ 395/130 |

OTHER PUBLICATIONS

"3D For Free", Jeff Mace, PC Magazine, Dec. 3, 1996, pp. 259–276.

*Primary Examiner*—Tan V. Mai
*Attorney, Agent, or Firm*—Fenwick & West LLP

[57] ABSTRACT

A multiplier array is modified to perform interpolations. The interpolations use a normalized first operand A between 0 and 1. The interpolation is the function B * A+C * (1−A). Standard multipliers accept two operands as inputs, but interpolations require 3 operands (A, B, C). The AND gates in Booth encoders in a standard multiplier array are replaced by multiplexers. Each multiplexer selects a bit from one of the two operands (B or C) based on a bit of the first operand A. The interpolate operation multiplies the first operand A by the second operand B while simultaneously multiplying the bit-wise inverse of the first operand A' by the third operand C. Since one multiply is with the first operand A while the second multiply is with the inverse A' of the first operand, one of the multiplies always generates zero while the other multiply generates either a one or a zero for each bit of the first operand. The multiply producing zero is deleted by not being selected by the multiplexer; instead the multiplexer selects the other multiply as an intermediate product term. Thus the intermediate product terms for the half of the inputs which generate a zero product term are never generated. A correction term is generated and added in to account for the difference between the bit-wise inverse of A and the two's complement of A. The multiplexers can be enlarged to allow either standard 2-operand multiplies or 3-operand interpolations in the same multiplier array. The interpolator-multiplier is especially useful for 3D graphics applications.

17 Claims, 4 Drawing Sheets

$R_{BW} = R_W * F + R_B * (1-F)$

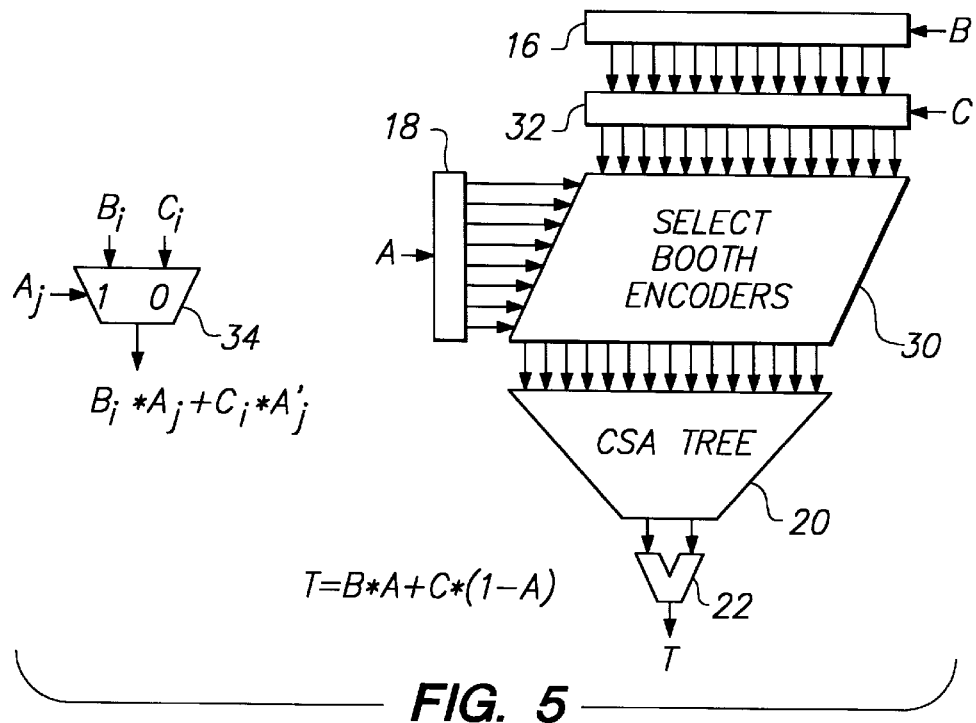
FIG. 5
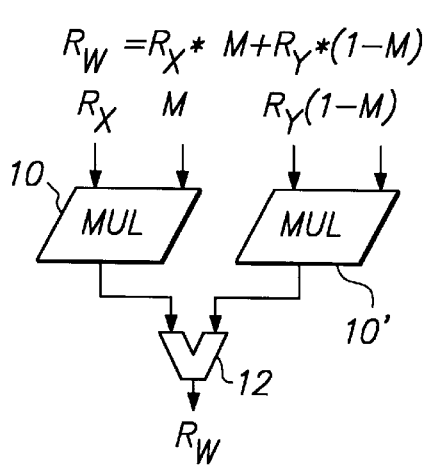
FIG. 3 (PRIOR ART)
$A = .1100 = 3/4$
$B = 1010 = 10$
$C = 0010 = 2$
| $i$ | $A_i$ | SELECT | $TERM_i$ |
|---|---|---|---|
| 0 | 0 | C | 0010 |
| 1 | 0 | C | 0010 |
| 2 | 1 | B | 1010 |
| 3 | 1 | B | 1010 |
| X | X | C | 0010 |
| | SUM= | | 1000.0000 |
CHECK:
$T = B*A + C*(1-A)$
$T = 10*3/4 + 2*(1-3/4)$
$T = 30/4 + 2/4 = 32/4 = 8$
FIG. 6

$R_W = R_X * M + R_Y * (1-M)$
$G_W = G_X * M + G_Y * (1-M)$
$B_W = B_X * M + B_Y * (1-M)$
$A_W = A_X * M + A_Y * (1-M)$

MULTIPLIER WITH SELECTABLE BOOTH ENCODERS FOR PERFORMING 3D GRAPHICS INTERPOLATIONS WITH TWO MULTIPLIES IN A SINGLE PASS THROUGH THE MULTIPLIER

BACKGROUND OF THE INVENTION

1. Field of the Invention

This invention relates to binary multipliers for computer systems, and more particularly to multipliers adapted for 3-D graphics calculations.

2. Description of the Related Art

One of the most compute-intensive applications is the manipulation and rendering of three-dimensional objects for display on a two-dimensional display screen. Yet three-dimensional (3D) graphics applications are becoming more popular with computer users and should continue to gain popularity as higher-performance computers emerge.

Three-dimensional objects or surfaces are approximated as connected polygons or triangles. Greater detail can be obtained by using a greater number of smaller triangles to approximate the object or surface. Distances and angles from a viewer to these objects are calculated and used to determine which surfaces to display and which surfaces to hide. Surfaces farther away from the viewer or at a high angle to the viewer can be shaded or shown in less detail than closer, flat surfaces.

The image displayed on the computer's display screen is generated from the position, color, and texture of the triangles which are stored in the computer's memory. Each triangle is divided into lines of pixels which are stored and scanned to the display screen. However, the triangle directly specifies the color of only three points—the three vertices of the triangle. The color of pixels within the triangle must be calculated from the colors of the three vertices. Thus a large amount of computational work is needed to interpolate from the three vertices the colors of the many pixels within the triangle.

DRAWING PRIMITIVES STORE COLORS OF VERTICES

FIG. 1A is a diagram of a triangle which is a drawing primitive of a 3D object or surface. Imaginary pixels are located at the three vertices X, Y, Z of the triangle. From the colors of the imaginary pixels at vertices X, Y, Z the color of any pixel within the triangle can be calculated.

The color of a pixel is designated by the intensity of the red, green, and blue (RGB) color components. Each color component may be encoded as an eight-bit or a sixteen-bit binary value. A fourth component, alpha or A, is often used. This fourth component can be used for blending, shading, or distance effects. Vertex X is identified by a pixel with four 8-bit components (R, G, B, A) and is designated $(RGBA)_X$. Vertex Y is also identified by a pixel with four 8-bit components (R, G, B, A) and is designated $(RGBA)_Y$, as is vertex Z by another pixel with four 8-bit components (R, G, B, A) designated $(RGBA)_Z$. Only 24 bits of the pixel, the R, G, B components, are visible as a 24-bit pixel.

COLOR OF PIXELS CALCULATED FROM VERTEX COLORS

FIG. 1B is a triangle drawing primitive divided into horizontal scan lines of pixels. When the triangle is rendered, the locations of the horizontal scan lines and the pixels on those lines are calculated from the distance and angle to the viewer. Imaginary pixel W is located a normalized distance M from vertex Y and a normalized distance 1-M from vertex X along the X-Y edge of the triangle. An actual pixel is located to the right of imaginary pixel W on the horizontal scan line which intersects line X-Y at imaginary pixel W.

The color of imaginary pixel W is calculated from the colors of imaginary pixels X and Y at the nearest vertices of the triangle. An interpolation calculation is performed to calculate the color of pixel W as a blend of the colors of vertices X and Y. When imaginary pixel W is closer to vertex X, the color of W is closer to the color of vertex X. Imaginary pixels closer to vertex Y are closer to the color of vertex Y than to the color of vertex X.

An interpolation is performed for each of the four color components R, G, B, A. The interpolation for the red (R) color component of imaginary pixel W is:

$$R_W = R_X * M + R_Y * (1-M).$$

The 8-bit R color component of vertex X is multiplied by the normalized distance M from vertex Y to imaginary pixel W. The 8-bit R color component of vertex Y is then multiplied by the normalized distance (1-M) from vertex X to imaginary pixel W. These two products are added together to get the R color component of imaginary pixel W. Similar calculations are performed for the green and blue color components and possibly alpha. Each interpolation has two multiplies and one add. Thus each imaginary pixel requires four interpolations, or eight multiplies.

The interpolation calculation is repeated for each imaginary pixel at each intersection of a horizontal scan line with one of the three edges of the triangle. Since each imaginary pixel requires four interpolation calculations, each scan line with two imaginary pixels requires eight interpolations. The 12 scan lines of the small triangle in FIG. 1B require 96 (24×4) interpolations, or 192 multiplies.

COLOR INTERPOLATIONS REQUIRED TO CALCULATE COLOR OF EACH PIXEL

FIG. 1C is a diagram showing calculation of the color of a pixel inside a triangle drawing primitive. The color of pixel U is interpolated from the colors calculated for the imaginary pixels W and V at the points where the horizontal scan line crosses the edges of the triangle. The interpolation calculation for the green (G) color component of pixel U is:

$$G_U = G_W * N + G_V * (1-N)$$

where N is the normalized distance along the horizontal scan line from imaginary pixel V to actual pixel U. The normalized distance is a floating point number between 0.0 and 1.0, obtained by dividing the distance from imaginary pixel V to actual pixel U by the total distance from imaginary pixel V to imaginary pixel W.

MANY INTERPOLATIONS REQUIRED EVEN FOR A SIMPLE POLYGON

The interpolation calculation must be repeated for each of the color components for each pixel on each horizontal scan line. For the 12 scan lines crossing the triangle, if each line has about 10 pixels, then 120 pixels must be interpolated. This requires 120×4 interpolation calculations, or 960 (120× 8) multiplies. Thus over a thousand multiply operations are needed to render even a relatively small triangle. Multiplies are among the most compute-intensive operations a computer can perform, and a dedicated hardware multiplier is often included in processors. Since each interpolation contains two multiples, interpolations are quite compute-intensive. The large number of pixels in even a relatively simple 3D object can quickly absorb a processor's computational bandwidth.

When only a linear interpolation is needed, as when the pixels are evenly spaced, then addition of a delta value can be used rather than interpolations for each pixel. This is known as Gouraud shading. Phong shading improves the image by calculating the normal angle at the vertices. However, the image appears computer-generated when simple linear addition of a constant is used. Better-appearing techniques use non-linear textures such as texture maps which often require multiplication rather than simple addition.

FOG AND OTHER EFFECTS USE INTERPOLATION

Other special graphics effects also use interpolation instructions. For example, a white fog may be superimposed over an object to give the illusion of a mist or fog between the viewer and the object. Objects farther from the viewer have more of the white fog and less of the object's color.

FIG. 2 illustrates blending using an interpolation to produce a fog or translucency effect. A blue triangle has a solid color represented by $(RGBA)_B$ which is constant over the entire polygon. A white fog is to be applied to the blue triangle so that the blue is mixed with white to give the appearance of a white fog between the viewer and the blue triangle. The relative amount of white increases as the distance of the blue triangle to the viewer increases. The value A of the blue triangle may be inversely related to the distance from the viewer. Polygons with smaller A values that are farther from the viewer may be blended with a greater proportion of white fog to show distance.

The intensity of the white fog is indicated by its value A, and its color is represented by $(RGBA)_W$. A blending factor F can be calculated as the A value of the white fog divided by the sum of the A values of the fog and the blue triangle. The color of the blue triangle displayed with the fog effect is then calculated using an interpolation of each of the color components. The interpolation for the red component of the blended blue-white triangle is:

$$R_{BW}=R_W*F+R_B*(1-F).$$

The white fog could be replaced by another color, such as for a yellow mist, or this blending technique can be applied to blend two or more polygons for translucency or ghost effects.

COLOR INTERPOLATE USEFUL FOR MANY 3D EFFECTS

The color interpolate operation may be used for many other techniques. Anti-aliasing, depth cueing, texture-map interpolation, alpha blending, fog, translucency, Phong shading and Gouraud shading all may use interpolation. Interpolation represents the majority of color math performed in rendering images, as nearly all pixel or texture pixel (texel) information is interpolated into the final rendered pixel.

Anti-aliasing removes jagged lines at the edge of a polygon by blending pixels at the edge of the polygon. The polygon's color is blended with a background color so that the polygon's edge gently blends into the background rather than abruptly changes. For fog, the alpha or blending factor is the adjusted distance of the polygon to the viewer. The color of the polygon is blended with white. Gouraud shading interpolates two vertex colors where the blending factor is the position between the two vertices. Bilinear interpolation blends the two closest pixels in each dimension, using the location between the two as the blending factor.

The white fog may be replaced with a complex map of a texture to be mapped onto the polygon. Interpolation between four virtual pixels on a texture map is used in Bi-linear interpolation. The four closest values from a texture map are interpolated in each dimension to determine what color to render to the pixel. Different texture maps are stored for different resolutions (sizes) of polygons in level-of-detail (LOD) MIP-mapping. A third technique called "tri-linear MIP mapping" interpolates between four closest virtual pixels on the two closest texture maps for the polygon's resolution.

What is desired is to use a common interpolate instruction for most 3D graphics applications. It is desired to modify a standard multiplier array in a general-purpose processor to execute an interpolate instruction for color and graphics blending. It is desired to double performance by executing an interpolate instruction having two multiplies in a single pass through a single multiplier array.

SUMMARY OF THE INVENTION

A multiplier-interpolator has a first, second, and third operand input, each being a plurality of electrical signals representing an operand.

Product-term generators produce intermediate products. Each product-term generator receives a bit of the first operand and a bit of the second operand and a bit of the third operand. Each product term generator outputs as an intermediate product either the bit of the second operand or the bit of the third operand in response to the bit of the first operand.

A summer receives the intermediate products from the plurality of product-term generators. It generates a sum of the intermediate products. The sum is a result of interpolating the second operand and the third operand by the first operand. Thus interpolation of three operands is performed by the multiplier-interpolator.

In further aspects of the invention the result is generated in a single pass through the plurality of product-term generators and the summer. Thus interpolation of three operands is performed in a single pass through the multiplier-interpolator.

In still further aspects each product term generator outputs as the intermediate product (a) the bit of the second operand when the bit of the first operand is one, or (b) the bit of the third operand when the bit of the first operand is zero. The multiplier-interpolator performs a multiply of the first operand with the second operand while simultaneously performing a multiply of the bit-wise inverse of the first operand with the third operand. Thus two multiplies are simultaneously performed in a single pass through the plurality of product-term generators and the summer.

In other aspects of the invention the first operand has i bits and the second operand has j bits and the third operand has j bits. The number of product-term generators is substantially (i×j). Thus two multiplies are simultaneously performed using i×j product term generators.

In other aspects an adjustment term generator receives the third operand. It generates an adjustment for output to the summer. The adjustment is a difference between the bit-wise inverse of the first operand and a two's complement of the first operand. Thus the product-term generators multiply the third operand by the bit-wise inverse of the first operand, but the result is adjusted to the two's complement of the first operand. The adjustment is the third operand multiplied by a least-significant bit of the first operand.

In still further aspects each product-term generator is a multiplexer with a bit of the first operand as a select control input and bits of the second and third operands as data inputs. Thus multiplexers select either the bit from the second operand or the bit from the third operand in response to the bit from the first operand to generate the intermediate products.

BRIEF DESCRIPTION OF THE DRAWINGS

FIG. 3 is a diagram of execution of an interpolation operation using two passes through a multiplier.

FIG. 5 is a diagram of a multiplier with Booth encoders replaced by select logic to execute an interpolate instruction with two multiplies in a single pass through the multiplier.

FIG. 6 is an example of an interpolation calculation using selection of two operands to generate product terms.

DETAILED DESCRIPTION

The present invention relates to an improvement in 3D graphics multipliers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1A:
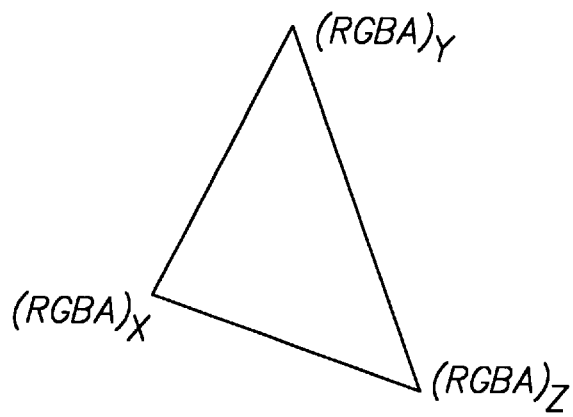
FIG. 1A is a diagram of a triangle which is a drawing primitive of a 3D object or surface.
Figure 1B:
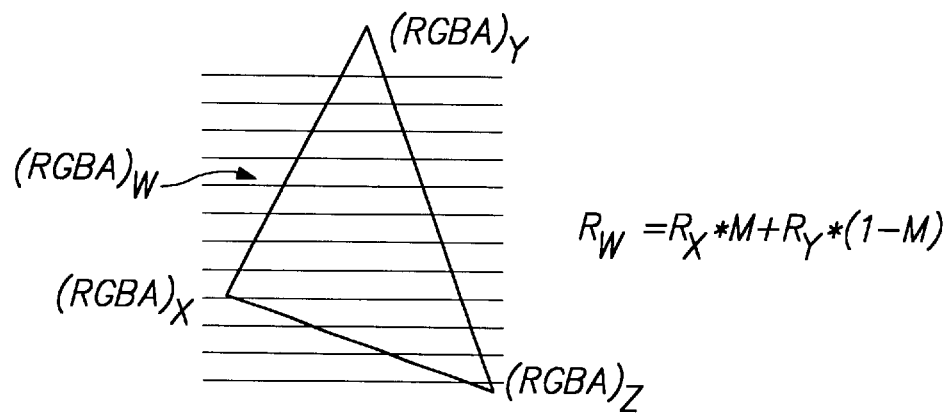
FIG. 1B is a triangle drawing primitive divided into horizontal scan lines of pixels.
Figure 1C:
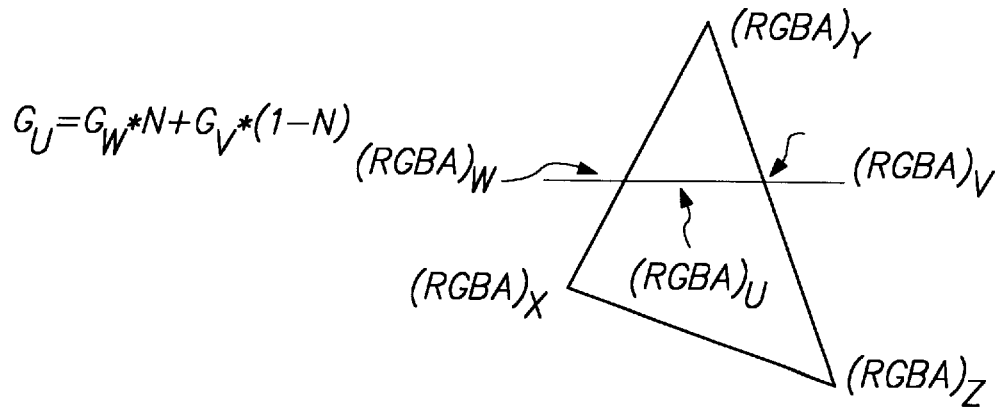
FIG. 1C is a diagram showing calculation of the color of a pixel inside a triangle drawing primitive.
Figure 2:
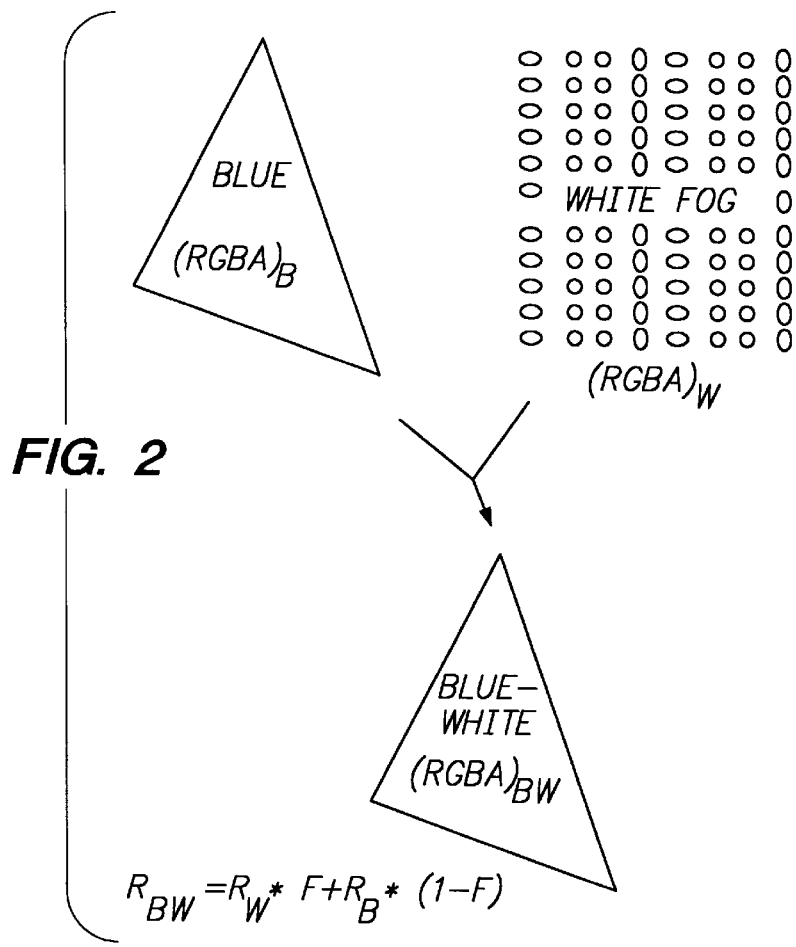
FIG. 2 illustrates alpha blending using an interpolation to produce a fog or translucency effect.

FIG. 3 is a diagram of execution of an interpolation operation using two passes through a multiplier. The interpolation could calculate the edge pixel W from vertex pixels X and Y, as was shown for FIG. 1A, or the interpolation could be used for another type of effect. The interpolation equation for blending the red color components of pixels X and Y using the blending or interpolation factor M to generate pixel W is:

$$R_w = R_x * M + R_y * (1-M).$$

This interpolation has two multiplies, one for calculating the contribution from each of pixels X and Y. In a first multiplier array 10, the red component of pixel X is multiplied with blending factor M. In a second multiplier array 10' the red component of pixel Y is multiplied with blending factor 1-M. The products from multiplier arrays 10, 10' are input to adder 12 which outputs as its sum the red component of the blended pixel W.

Rather than construct two separate multiplier arrays 10, 10', most implementations use just one multiplier array multiple times. Thus the first product of pixel X is generated by the multiplier array and stored in a temporary register. Then the second product of pixel Y is generated by the same multiplier array and then added to the first product that was stored in the temporary register. A multiply-add instruction, MULADD, may be used in the second pass to add in the first product.

Thus the interpolation operation as known in the prior art uses either two multiplier arrays, or two steps or passes through a multiplier array. The interpolation operation appears as a MUL instruction followed by a second MUL and an ADD instruction:

MUL temp1, $R_X$, M
MUL temp2, $R_Y$, (1-M)
ADD $R_W$, temp1, temp2.

The final two instructions can be combined into a MULADD:

MUL, temp, $R_X$, M
MULADD $R_W$, temp, $R_Y$, (1-M).

Some pre-processing such as an extra subtract is necessary to generate (1-M), but this may be performed once for several interpolations for certain operations such as bilinear interpolation.

GRAPHICS INTERPOLATE INSTRUCTION

While an interpolation can be accomplished using two multiplies and an add, the inventor has noted the frequent use of interpolations in 3D graphics. The inventor has concluded that most 3D graphics operations can be performed using a simple graphics interpolate instruction (gcint) of the form:

gcint T, A, B, C which executes the equation:

$$T = B * A + C * (1-A).$$

The blending or interpolate factor A is a floating-point number normally between 0.0 and 1.0, but the gcint instruction outputs B when A is greater or equal to 1.0, but outputs C when A is zero or less than zero.

Operand A is a floating point number, but operands B and C are graphics sub-pixels, such as 8-bit or 16-bit color components of a pixel. The result T is a sub-pixel color component of 8 or 16 bits.

While such an atomic graphics interpolate instruction can be micro-coded to perform two separate multiplies, the inventor desires to modify the multiplier array to atomically execute the graphics interpolate instruction in a single step rather than in two steps.

BINARY PROPERTY OF INTERPOLATE EXPLOITED TO PERFORM TWO MULTIPLIES IN ONE MULTIPLY STEP

The inventor has found that interpolation in binary arithmetic has some unusual properties which can be exploited to perform an interpolation, appearing to require two multiplies, in a single multiply step.

The interpolation operation multiplies one operand by the floating point value A, but the other operand by 1-A. The value of A is always between 0 and 1 since A is normalized. Table 1 shows some values of A and 1-A.

TABLE 1

A and 1-A

| A | 1-A |
|---|---|
| 0.0000 | 1.0000 |
| 1.0000 | 0.0000 |
| 0.0001 | 0.1111 |
| 0.1111 | 0.0001 |
| 0.1010 | 0.0110 |
| 0.0101 | 0.1011 |

While no apparent relationship may at first be seen, Table 2 shows that 1-A is similar, but not identical, to the two's complement of A.

TABLE 2

2's Complement of A and 1-A

| A | 2's Complement of A's Fraction | Inverse of A's Fraction + .0001 | 1-A |
|---|---|---|---|
| 0.0000 | .0000 | .1111 + .0001 | 1.0000 |
| 1.0000 | .0000 | .1111 + .0001 | 0.0000 |
| 0.0001 | .1111 | .1110 + .0001 | 0.1111 |
| 0.1111 | .0001 | .0000 + .0001 | 0.0001 |
| 0.1010 | .0110 | .0101 + .0001 | 0.0110 |
| 0.0101 | .1011 | .1010 + .0001 | 0.1011 |

The non-fractional part of A can be ignored if the end conditions, when A is 1.0 or 0.0, are explicitly executed by selecting B or C rather than perform a multiply. Restricting A to being between 1.0 and 0.0 allows the leading non-fractional digit to be truncated.

The two's complement of the fractional part of A is always equal to 1-A, as seen by comparing the second and last columns of Table 2. Notice that the two's complement of A is the bit-wise inverse of the fractional part of A added to a one in the least-significant bit-position. This is shown in the third column of Table 2.

In binary multiplication, each bit of one number is multiplied by each bit of a second number to generate intermediate product terms. The intermediate product term is a binary one when the bits being multiplied from both of the numbers are binary one. When any bit is a zero, its intermediate product terms are always zero.

MULTIPLY BY BOTH A AND INVERSE A CONTRIBUTES ONLY ONE PRODUCT TERM

In binary numbers, a bit is either a one or a zero. When a digit or bit-position in A is a one, the corresponding bit position in the inverse of A must be a zero. Since multiplication of anything by zero is always zero, only A or the inverse of A can contribute to a final product.

For example, when A is 0.0101, the inverse of A is 0.1010 as shown in the last row of Table 2. The left-most bit of A is 0, while the left-most bit of inverse A is 1. When the left-most bit of A is multiplied by any number, the result is zero. For the left-most bit-position, only inverse A contributes to the final product. The left-most 0 in A guarantees that all partial products formed from this left-most bit are zero.

Since adding zero to a sum does not change the sum, the multiply by zero can be ignored.

SELECT EITHER A OR INVERSE A FOR EACH BIT IN MULTIPLY

Selection logic is used for each bit-position in A to select:
B when A's bit is one
C when A's bit is zero.
For each bit-position of A, either B or C contributes to the final sum, but not both B and C. Thus one of the multiplies for each bit-position is always a zero and can be ignored.

INTERPOLATE EQUATION MODIFIED TO MULTIPLY INVERSE, NOT 1-A

Thus since 1-A is similar to the inverse of A, the inventor changes the interpolate equation which multiplies (1-A):

$$=B^*A+C^*(1-A)$$

to:

$$=B^*A+C^*(\text{inverse of }A)+C^*(0.0001)$$

Which multiplies the inverse of A. The part of the equation:

$$B^*A+C^*(\text{inverse of }A)$$

is executed by selecting a bit from B when the bit from A is 1, but selecting a corresponding bit from C when the bit from A is 0, for all combinations of bits in A and B or C. When A is an 8-bit number (i=8) and B and C are 16-bit numbers (j=16), there are 8×16 or 128 combinations of A and B/C, called intermediate product terms $A_i BC_j$. Two full multiplies would generate 128 terms $A_i B_j$, and another 128 terms $A_i C_j$. Instead, the invention generates only one set of 128 terms $A_i BC_j$, with a term for each bit of A for either B or C, but not for both. Thus the number of intermediate product terms is reduced by half using the invention to select either B or C for each intermediate product term of A.

CONSTANT ADDED TO ADJUST INVERSE TO TWO'S COMPLEMENT

The third part of the equation above:

$$C^*(0.0001)$$

is necessary to account for the difference between the inverse of A and the two's complement of A. The two's complement of A is the inverse of A added to a one in the least-significant bit-position. The number 0.0001 is for the example of a 4-bit value for A; actual values of A of 8 or more bits have different constants multiplied by C. An 8-bit A has $$C^*(0.00000001)$$

as the third part of the equation, while a 16-bit A has $$C^*(0.0000000000000001).$$

Since C is multiplied by a constant having only a single one, it is only necessary to generate one intermediate product term for the width of C. Multiplies by zero are ignored. Thus the third part of the equation adds another 16 terms for 16-bit values of operand C.

MULTIPLIER HARDWARE

The multiplier hardware can be simplified since the bit-wise inverse, rather than the two's complement of A is used for the multiply. While selection logic at first appears to be more complex than standard multiply logic, the selection logic can be a simple 2:1 mux rather than a standard AND gate for the Booth encoders.

PRIOR-ART MULTIPLIER USES AND GATES TO GENERATE PRODUCT TERMS

Figure 4:
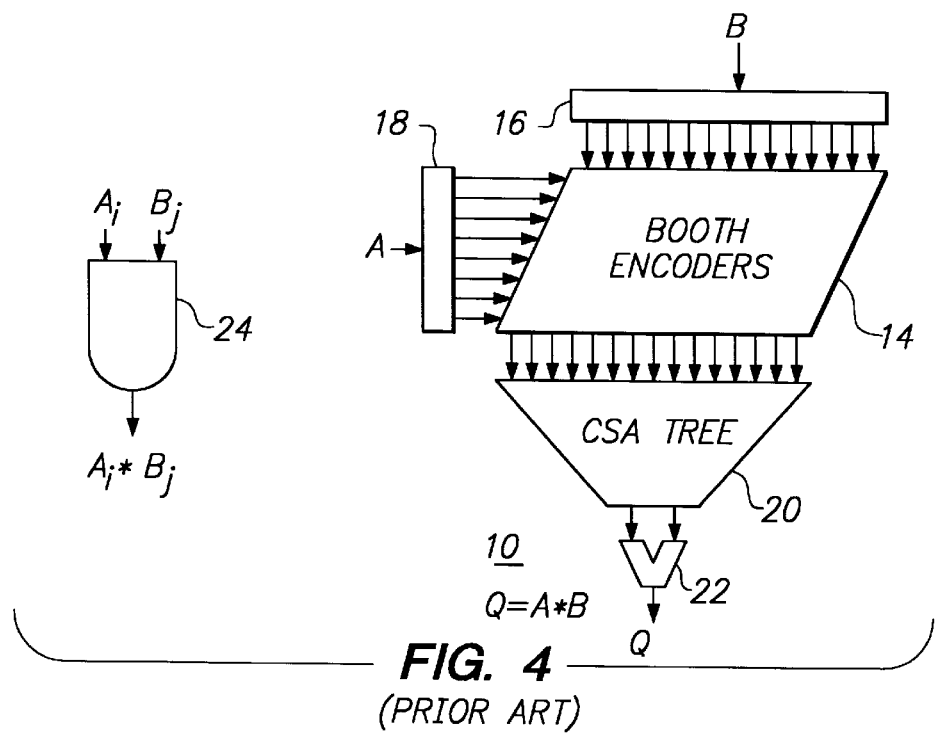
FIG. 4 is a prior-art multiplier array using AND gates for Booth encoders.

FIG. 4 is a prior-art multiplier array using AND gates for Booth encoders. Multiplier array 10 multiplies A by B to generated final product Q. Input operand A is loaded into buffer or latch 18 and applied to booth encoders 14, while input operand B is loaded into buffer or latch 16 and also applied to booth encoders 14. Booth encoders 14 generate intermediate product terms for each combination of bits of A and B. Each bit of A is multiplied by each bit of B. When A is an 8-bit number (i=8) and B is a 16-bit number (j=16), there are 8×16 or 128 combinations of A and B, called intermediate product terms $A_iB_j$. Since a binary product is one only when both bits are one, each intermediate product term in Booth encoders 14 is a simple AND gate 24. There are i×j AND gates 24 in Booth encoders 14.

The 128 intermediate product terms from Booth encoders 14 are input to carry-save adder tree 20. Carry-save adder tree 20 is a tree of 3-input carry-save adders, each outputting a sum and a carry bit, as is well-known in the art. The final carries and sum bits are output from carry-save adder tree 20 to adder 22 which generates the final sum Q.

BOOTH ENCODERS MODIFIED FOR SELECT LOGIC—FIG. 5

FIG. 5 is a diagram of a multiplier with Booth encoders replaced by select logic to execute an interpolate instruction with two multiplies in a single pass through the multiplier. Interpolating multiplier 38 simultaneously multiplies A by B and A-1 by C to generated final product T. Input operand A is loaded into buffer or latch 18 and applied to selecting booth encoders 30, while input operand B is loaded into buffer or latch 16 and also applied to selecting booth encoders 14. Input operand C is loaded into latch 32 and simultaneously applied to selecting Booth encoders 30.

Selecting Booth encoders 30 generate intermediate product terms for each combination of bits of A and B/C. Each bit of A is multiplied by each bit of B or C. Rather than generate a product term for each bit of A and B and another product term for each bit of A and C, only one product term is generated for each bit of A and both corresponding bits of B and C. Thus the number of product terms is reduced by half compared to a full multiply of A with both B and C. When A is an 8-bit number (i=8) and B and C are a 16-bit numbers (j=16), there are 8×16 or 128 combinations of A and B/C, called intermediate product terms $A_iBC_j$.

The inverse of A is multiplied with C, while A is multiplied with B. For any bit-position in A, either the bit in A is a one or the inverse of that bit of A is a one. Both A and inverse A cannot be a one. Thus for each bit-position in A, one of the two product terms of A and inverse A must be a zero. The other product term is either a one or a zero, depending on the bit in B or C. Since a binary product is one only when both bits are one, each intermediate product term in selecting Booth encoders 30 is a simple 2:1 multiplexer 34. Multiplexer 34 selects the bit in B when the bit i of A is one, but selects bit j in C when bit i in A is zero (inverse $A_i$ is one). There are i×j multiplexers 34 in selecting Booth encoders 30.

The adjust for using inverse A rather than the two's complement of A requires no gates in selecting Booth encoders 30. Instead, the bits of operand A are copied to intermediate product terms as if they were multiplied by a one in the least significant bit of operand C. Thus additional i product terms are output from selecting Booth encoders 30 for the two's complement correction, C*(0.000000000000000(1). A total of i×j plus i product terms, or (i+1)×j terms are output from selecting Booth encoders 30. For i=8 and j=16, 136 product terms are generated. The 136 intermediate product terms from selecting Booth encoders 30 are input to carry-save adder tree 20. Carry-save adder tree 20 is a tree of 3-input carry-save adders, each outputting a sum and a carry bit, as is well-known in the art. The final carries and sum bits are output from carry-save adder tree 20 to adder 22 which generates the final sum T.

EXAMPLE OF INTERPOLATION USING SELECTING BOOTH ENCODERS FIG. 6

FIG. 6 is an example of an interpolation calculation using selection of two operands to generate product terms. The interpolation equation is:

$$T = B^*A + C^* \text{ (inverse of } A) + C^* (0.0001).$$

Four-bit values of A, B, and C are shown to simplify the example. The blending or interpolation operand A is 0.1100, or 3/4 (0.75 decimal). Operand B is 1010 (10 decimal) while operand C is 0010 (2 decimal).

For each bit i of operand A four product terms are generated. In each product term, the value of the bit in A is used to select either B or C. B is selected when the bit of A is one, while C is selected when the bit of A is zero, since the inverse of A is one.

The least-significant bit (LSB) of A is 0, so operand C is selected for all bits of C for the i=0 term. The next bit of A (i=1) is also 0, so again all bits of C are selected, as shown for the second term. The bits of C are shifted to the left by one position since the bit of A is the second bit. The third bit (i=2) of A is 1, so B is selected rather than C. Each bit of B is selected and shifted two positions to the left since the third bit of A is the multiplier. Finally the fourth and most-significant bit (MSB) of A (i=3) is the multiplier. The MSB of A is a 1, so B is again selected. The bits of B are left-shifted by three positions to correspond to the A multiplier bit's significance.

Another term is added to adjust for using the inverse of A in the previous calculations rather than using the two's complement of A. This extra term is labeled i=x in the Table in FIG. 6. Operand C is always selected for this adjustment term. The adjustment term is not shifted since the adjustment to two's complement is to add a one in the least-significant position.

The four terms from multiplier A and either B or C are added together with the extra term for two's complement adjustment. The sum of the five terms is 1000.0000 with the "decimal" point four positions to the left since A is a floating point number with four positions less than one (0.xxxx).

The sum 1000.0000 is the decimal value 8. Checking the math in decimal, for A=¾, B=10 and C=2, the result of the interpolation should be:

$$T = B*A + C*(1-A)$$
$$= 10 *\tfrac{3}{4} + 2*(1-\tfrac{3}{4})$$
$$= 30/4 + 2*(\tfrac{1}{4})$$
$$= 30/4 + \tfrac{2}{4}$$
$$= 32/4$$
$$= 8$$

which is the same answer obtained using the binary selecting interpolation calculation. The answer is also intuitively correct, since a blend of ¾ of 10 and ¼ of 2 is 8. Three-quarters of the distance between 2 and 10 is 8.

SELECTING MULTIPLIER USES MUXES INSTEAD OF AND GATES

In each step, the value of the bit in A is used to select either B or C. B is selected when the bit of A is one, while C is selected when the bit of A is zero, and the inverse of A is one. This simple calculation is implemented using muxes as the selecting Booth encoders rather than AND gates. The carry-save-adder tree and the final adder then add all the terms together with the two's complement adjustment term.

Two multiplies are performed in the same pass through the multiplier. Since for any bit-position, one of the multiplies is always a multiply by zero, while the other multiply is always a multiply by one, the product from the multiply by zero can be discarded or simply not generated. The product of the multiply by one is selected for each bit-position. These intermediate products are then added in a standard carry-save-adder tree. Thus two multiplies, rather than just one multiply, are performed simultaneously in a single multiplier using selecting encoders (muxes) rather than standard Booth encoders (AND gates). The multiply by zero is detected and ignored at the first stage of the multiplier, reducing by half the number of product terms that must be added together.

CONFIGURABLE MULTIPLIER EMBODIMENT

While a multiplier can be designed as described above to perform interpolation multiplies, that multiplier does not perform standard multiplier which are not interpolations. For a general-purpose central processing unit (CPU), it is desirable to have a single multiplier which can execute standard multiplies or interpolation multiplies.

The interpolation multiplier described in FIG. 5 can be modified slightly to execute either interpolation multiplies or standard multiplies. For interpolation multiplies, the Booth encoders are configured operate on three operands, while for standard multiplies, the Booth encoders are configured to operate on two operands. For interpolation multiplies, the Booth encoders use select logic to select either the B or C operand for each product term. These Booth encoders are configured to perform a standard AND function when a standard multiply is performed.

Figure 7:
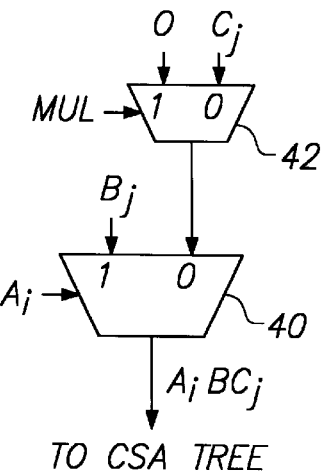
FIG. 7 shows a product term generator in a selecting Booth encoder in a multiplier which can interpolate with three operands or perform a standard multiply on two operands.

FIG. 7 shows a product term generator in a selecting Booth encoder in a multiplier which can interpolate with three operands or perform a standard multiply on two operands. Multiplexer or mux 42 selects 0 when signal MUL is high, indicating that a standard multiply operation is being performed. When an interpolation multiply is being performed, signal MUL is low, causing mux 42 to select a bit j of operand C, the third operand. Thus mux 42 inputs a third operand when a 3-operand interpolate multiply is being performed, but a constant when a 2-input standard multiply is being performed.

Selecting mux 40 receives the output from mux 42, which is zero for standard multiplies or bit j of operand C for interpolate multiplies. Bit j of operand B is applied to the other input of selecting mux 40. Bit i of the blending operand A is applied to the select input of selecting mux 40. The output of selecting mux 40 is an intermediate product term which is sent to carry-save adder tree 20 of FIG. 5 to be summed with all other product terms. There are i×j pairs of muxes 42, 40 in the selecting Booth encoders for the modified multiplier.

OPERATION—INTERPOLATE MULTIPLY

For 3-operand interpolate multiplies, signal MUL is low, causing mux 42 to apply bit j of operand C to an input of selecting mux 40. The other data input of selecting mux 40 receives bit j of operand B. The select input receives bit i of operand A. When $A_i$ is a one, operand B is selected, but when $A_i$ is zero, operand C is selected. Thus bit j from either operand B or operand C is selected by selecting mux 40. When bit j of the selected operand (either B or C, but not both) is zero, then the intermediate product term (ABC,) output from selecting mux 40 is also zero, and does not increase the final sum. But when the selected bit j is a one, the intermediate product term is also a one and increases the final sum.

OPERATION—STANDARD MULTIPLY

For standard 2-operand multiplies, signal MUL is high, causing mux 42 to apply a zero bit to an input of selecting mux 40. The other data input of selecting mux 40 receives bit j of operand B. The select input receives bit i of operand A. When $A_1$ is a one, operand B is selected, but when $A_i$ is zero, the zero output from mux 42 is selected. Thus when $A_i$ is zero, and the product term must also be zero, the zero output from mux 42 is selected as the intermediate product term $(A_iB_j)$ output from selecting mux 40. When $A_i$ is one, then the product term can be either a one or a zero, depending on bit j of operand B. Bit $B_j$ is then selected to the output of selecting mux 40. When bit j of operand B is zero, then the intermediate product term $(A_iB_j)$ output from selecting mux 40 is also zero, and does not increase the final sum. But when $B_j$ is a one, the intermediate product term is also a one and increases the final sum. Mux 42 can be implemented as a simple AND gate.

EXTRA TERM TO ADJUST FOR TWO'S COMPLEMENT—FIG. 8

The extra term is needed to adjust for the fact that the interpolate multiply is effectively performed using the bit-wise inverse of operand A, but the true interpolate requires the two's complement of A. Adding a one in the least significant position to the bit-wise inverse results in the two's complement. This one must then be multiplied by operand C.

Figure 8:
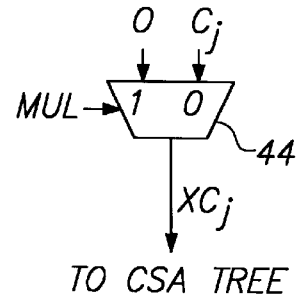
FIG. 8 shows an extra adjust term generator in a selecting Booth encoder.

FIG. 8 shows an extra adjust term generator in a selecting Booth encoder. Multiplexer or mux 44 receives each bit j of third operand C, $C_j$. When the MUL signal is low, indicating that an interpolate multiply is being performed, bit j of operand C is outputted from mux 44 to carry-save-adder tree 20 of FIG. 5. Thus the third term "C*(0.00000001)" is generated for all bits j in operand C to account for the difference between the bit-wise inverse of operand A and the two's complement of A.

When a standard multiply is being performed, no such adjustment term is needed. Signal MUL is high for the standard multiply, causing mux 44 to select a zero as the output to carry-save adder tree 20 of FIG. 5. Since zero bits do not increase the final result, the adjustment term is not added for standard multiplies but only for interpolate multiplies.

There are j muxes 44 from FIG. 8, and i×j pairs of muxes 40, 42 (FIG. 7) in a selecting Booth encoder for a i × j interpolator/multiplier. When A has 8 bits (i=8) and operands B and C have 16 bits ( =16), then 16 muxes 44 and 128 pairs of muxes 40, 42 are required for the selecting Booth encoders, a total of 272 2:1 multiplexers.

GRAPHICS INTERPOLATOR/MULTIPLIER— FIG. 9

Figure 9:
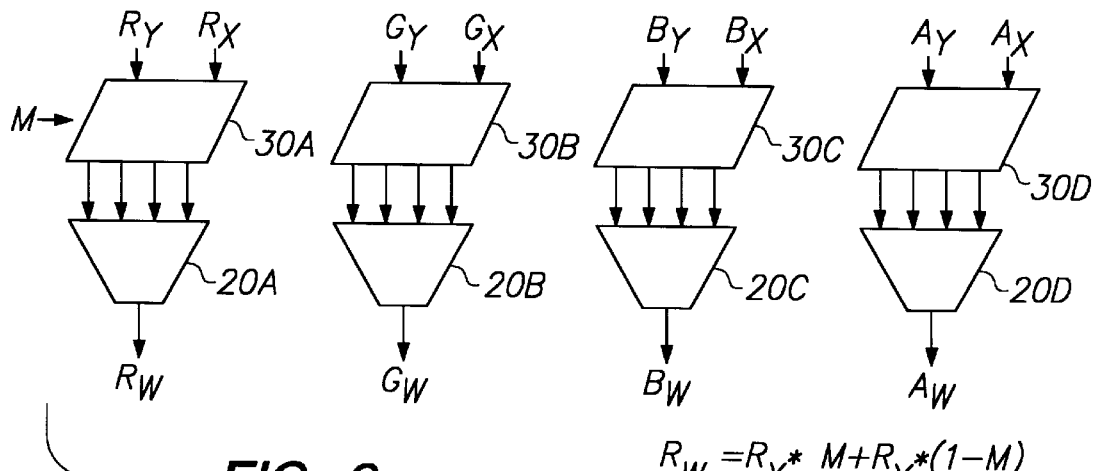
FIG. 9 is a diagram of a parallel graphics interpolator.

FIG. 9 is a diagram of a parallel graphics interpolator. Each pixel has three color components: Red, Green, Blue, and a fourth component: alpha (A). Interpolation must be performed on all three color components and often on the alpha component as well. It is possible to use a single multiplier to perform the four interpolations in series, one interpolation after another, but this is somewhat slow. Four interpolators/multipliers as described earlier may be included on a processor so that four interpolations can be performed in parallel, at the same time. Parallel interpolation significantly improves throughput.

Modern microprocessors operate on 32 or 64 bits of data, yet the color components are typically 8 or 16 bits in size. A full 32- or 64-bit multiplier may be needed for the general-purpose processor, but only 8- or 16-bit multiplies are needed for graphics interpolations. The full-size multiplier may be divided into smaller sections which can operate independently for 8-bit multiplies, or together as one large multiplier for 32-bit multiplies. Thus all four smaller pixel components can be interpolated simultaneously in a larger multiplier. Intel Corp. of Santa Clara, Calif. has announced microprocessors using "MMX", which allows for parallel operation. For example, four independent 16-bit additions can be performed simultaneously, in parallel, in a 64-bit adder. The 64-bit adder operates as 4 independent 16-bit sections in MMX mode.

The multiplier/interpolator of FIG. 9 has four independent sections for performing four independent interpolations simultaneously. Selecting Booth encoder sections 30A, 30B, 30C, 30D are each 8 by 16-bit encoders as described earlier for FIGS. 5 and 7–8. Carry-save-adder sections 20A, 20B, 20C, 20D receive the product terms from the selecting Booth encoders and each generate a result. A final adder is included in each section 20A–D.

The interpolation constant M is applied to all four selecting Booth encoders 30A–D as an 8-bit operand. Color components of pixels X and Y are applied as the second and third operands to selecting Booth encoders 30A–D. Interpolation operand M selects either pixel X's or pixel Y's bit for each position in operand M as described earlier. The results are the color components for pixel W.

When 64-bit multiplication is desired, the four selecting Booth encoder sections 30A–D and the four carry-save adder sections 20A–D operate together to generate a product for an 8×64 multiply. Carries from one carry-save adder section to another are enabled when full 64-bit multiply is performed, but disabled when independent operation is desired.

Figure 10:
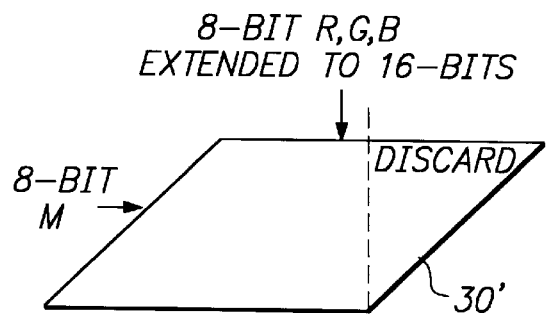
FIG. 10 is a diagram of a selecting Booth encoder with non-significant bits discarded.

FIG. 10 is a diagram of a selecting Booth encoder with non-significant bits discarded. Often the graphic pixels have 8-bit color components, but these components are extended to 16-bits for anti-aliasing, interpolation, or other purposes to facilitate smooth gradients of color across a surface. This allows a small increment to be added, incrementing a color component after ten, twenty or more pixels. Since the color components are stored as 8-bit components, the least significant bits of the result are discarded before storage. The selecting Booth encoders 30' for these less-significant bits can be eliminated to reduce hardware costs. This is a useful modification for dedicated graphics multipliers where a small error can be tolerated, but not for general-purpose multipliers.

ALTERNATE EMBODIMENTS

Several other embodiments are contemplated by the inventor. For example many embodiments of the carry-save adder tree are possible. Signals such as intermediate product terms may be inverted as is commonly done to minimize propagation delays in a circuit. While using a selecting Booth encoder in a general-purpose processor or CPU has been described, the invention could be applied to a graphics processor or subsystem. Many variations in multiplier arrays are known and can apply the invention by selecting one of two operands and discarding the other operand rather than simply ANDing operand bits. Multiplexers can be implemented as AND gates or other logic, or with transmission gates.

The final adder may be shared with other functions, such as a floating-point adder. Two or more intermediate results from the carry-save-adder tree may be temporarily stored, such as in a register. Some architectures such as the PowerPC™ architecture skip the final add step to reduce delays. The final add can often be performed as part of a later operation.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A multiplier-interpolator comprising:
   a first operand input comprising a plurality of electrical signals representing a first operand;
   a second operand input comprising a plurality of electrical signals representing a second operand;
   a third operand input comprising a plurality of electrical signals representing a third operand;
   a plurality of product-term generators for generating intermediate products, each product-term generator receiving a bit of the first operand and a bit of the second operand and a bit of the third operand, each product term generator outputting as an intermediate product either the bit of the second operand or the bit of the third operand in response to the bit of the first operand; and
   a summer, receiving the intermediate products from the plurality of product-term generators and receiving each bit of the third operand weighted in accordance with the least-significant bit of the first operand, for generating a sum being a result of interpolating the second operand and the third operand by the first operand,
   whereby interpolation of three operands is performed.

2. The multiplier-interpolator of claim 1 wherein the result is generated in a single pass through the plurality of product-term generators and the summer, whereby interpolation of three operands is performed in a single pass through the multiplier-interpolator.

3. The multiplier-interpolator of claim 2 wherein each product term generator outputs as the intermediate product the bit of the second operand when the bit of the first operand is one but outputs the bit of the third operand when the bit of the first operand is zero, the multiplier-interpolator performing a multiply of the first operand with the second operand while simultaneously performing a multiply of the bit-wise inverse of the first operand with the third operand, whereby two multiplies are simultaneously performed in a single pass through the plurality of product-term generators and the summer.

4. The multiplier-interpolator of claim 3 wherein the first operand comprises i bits and wherein the second operand comprises j bits and wherein the third operand comprises j bits, wherein a number of product-term generators is substantially (i×j), whereby two multiplies are simultaneously performed using i×j product term generators.

5. The multiplier-interpolator of claim 3 wherein each product-term generator comprises a multiplexer having a bit of the first operand as a select control input and bits of the second and third operands as data inputs, whereby multiplexers select either the bit from the second operand or the bit from the third operand in response to the bit from the first operand to generate the intermediate products.

6. The multiplier-interpolator of claim 5 wherein the first operand is a plurality of electrical signals representing a multi-bit binary number between zero and one and wherein the second and third operands are each a plurality of electrical signals representing a multi-bit binary number greater than or equal to zero.

7. The multiplier-interpolator of claim 6 wherein the first operand is stored in a floating-point number format while the second and third operand are stored in an integer format.

8. The multiplier-interpolator of claim 3 wherein each product-term generator further comprises:

standard multiply means, responsive to a multiply signal indicating that a two-operand multiply and not an interpolate is to be performed, for outputting as the intermediate product the bit of the second operand when the bit of the first operand is one but outputting a zero bit when the bit of the first operand is zero, the multiplier-interpolator performing a multiply of the first operand with the second operand when the multiply signal is active, whereby one multiply of two operands is performed when the multiply signal is active, but simultaneously performing two multiplies of three operands when the multiply signal is not active.

9. In a computer system having a processing unit, a memory graphics processing circuitry and a display device, a computer-implemented method for interpolating a second and a third operand by a first operand, the computer-implemented method comprising the steps of:

loading a first register with the first operand, loading a second register with the second operand, and loading a third register with the third operand:

multiplexing the outputs of the second and third registers by performing the substeps of:

selecting as a term i all bits of the second operand when the first operand has a value of one at bit-position i, but selecting as a term i all bits of the third operand when the first operand has a value of zero at bit-position i; and shifting term i to the significance of bit-position i to generate a shifted term i, for each bit-position i in the first operand;

generating an adjustment term from the third operand, the adjustment term being the third operand having the significance of the least-significant bit of the first operand; forming a sum of all shifted terms i generated and the adjustment term; and outputting a color signal corresponding to the sum to the display device, wherein the sum formed is the second operand multiplied by the first operand, added to the third operand multiplied by the two's complement of a fractional part of the first operand, whereby interpolation is performed on three operands.

10. The computer-implemented method of claim 9 wherein the first operand represents a value between zero and one.

11. The computer-implemented method of claim 9 wherein the step of selecting as term i is implemented in a hardware multiplexer.

12. The computer-implemented method of claim 10 wherein the steps of selecting as term i are implemented in i×j hardware multiplexers.

13. A graphics processor for interpolating between a first pixel and a second pixel using a blending variable, the graphics processor comprising:

a plurality of multiplexers, each multiplexer in the plurality of multiplexers receiving as data inputs a first bit from the first pixel and a second bit from the second pixel and receiving as a select control input a bit of the blending variable, each multiplexer outputting the first bit as an intermediate product when the bit of the blending variable is in a first state but outputting the second bit as the intermediate product term when the bit of the blending variable is not in the first state; and a carry-save-adder tree, receiving each bit of the second pixel weighted in accordance with the least-significant bit of the blending variable, and the intermediate product terms from the multiplexers, for reducing the intermediate product terms to a result of the interpolation, whereby the multiplexers select bits from either the first pixel or from the second pixel in response to each bit of the blending variable.

14. The graphics processor of claim 13 further comprising: second multiplexer means, coupled to each of the multiplexers and responsive to a multiply signal, for applying a zero bit as the second bit input to the multiplexers from the second pixel when the multiply signal is active, whereby standard multiplies are performed by applying a zero bit as the second bit input to the multiplexers.

15. The graphics processor of claim 13 wherein each multiplexer in the plurality of multiplexers receives a first bit from the first pixel and a second bit from the second pixel having a same significance.

16. The graphics processor of claim 13 wherein each multiplexer in the plurality of multiplexers receives a different combination of significance of bits from the blending variable and from the first pixel.

17. The graphics processor of claim 13 wherein the first pixel is a color component of a pixel and wherein the second pixel is a color component of a pixel, the result of the interpolation being a blend of a color of the first pixel and a color of the second pixel, the blend being a color of a displayed pixel.

* * * * *